Figure 1:
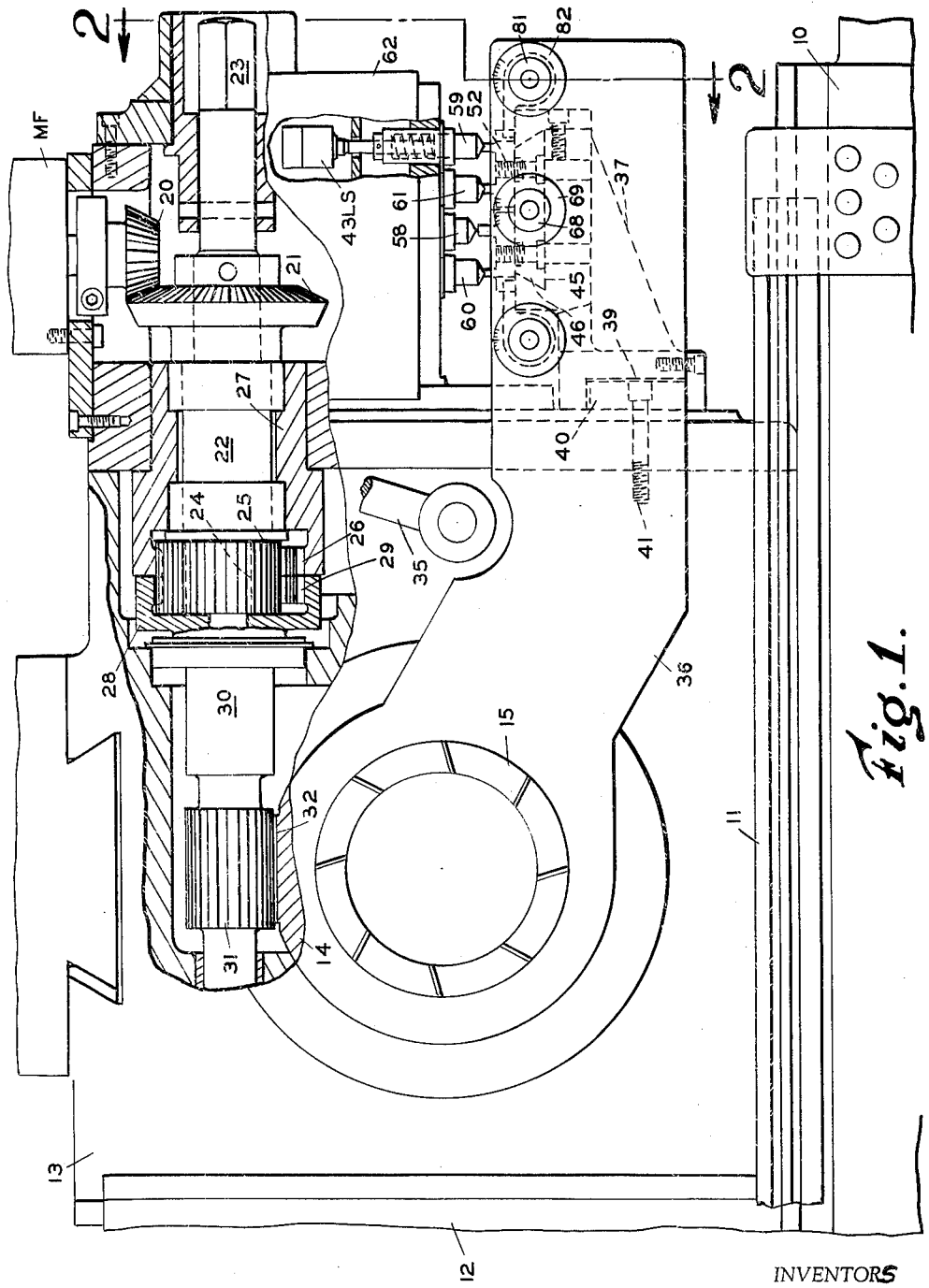

Oct. 12, 1965  C. H. BAKER ETAL  3,211,062
DOG SETTING DEVICE

Filed Oct. 25, 1963  4 Sheets-Sheet 1

INVENTORS
CLIFFORD H. BAKER
EDWARD B. CHILDERS
BY
Howard Keiser
John F. Verhoeven
ATTORNEYS

United States Patent Office 3,211,062
Patented Oct. 12, 1965

3,211,062
DOG SETTING DEVICE
Clifford H. Baker and Edward B. Childers, Cincinnati, Ohio, assignors to The Cincinnati Milling Machine Co., Cincinnati, Ohio, a corporation of Ohio
Filed Oct. 25, 1963, Ser. No. 318,947
6 Claims. (Cl. 90—16)

This invention relates to a position control device for a machine tool slide and, more particularly, to a mechanism for facilitating accurate setting of the stop dogs which control the operation or positioning of the slide.

In connection with certain types of machine tools employing power operated carriages or slides, it is customary to provide adjustable dogs on the slides for controlling the movement thereof by the power drive mechanism. When the dogs are used to effect accurate positioning of the slides, a great deal of care is required in the setting of the dogs on the slides in order to stop them in the correct positions. Furthermore, with certain types of setups, any change in the size of the cutter due to wear, or any change in the setting of the cutter following a tool change requires repositioning of the dogs. Thus, for example, when a series of cuts of different depths are to be made in a workpiece, once the dogs are set for the different depths of cut, any change in the cutter will affect the accuracy of the machining operation and will require either adjustment of the cutter or shifting of the dogs.

To simplify the operation of shifting the dogs in cases such as this, as well as to facilitate accurate positioning of the dogs in the first instance, a novel mechanism has been provided for positioning the dogs on the slide either individually or as a group. This mechanism may be used in connection with any appropriate slide of the machine tool, although in the present embodiment it is shown applied to the quill of a horizontal milling machine. Axial adjustment of the quill is effected by a motor operating under the control of an automatic sequence circuit which includes a group of limit switches associated with the quill and adapted to be operated by a series of dogs moving with the quill. After movement of the quill has been initiated by the operation of the sequencing circuit, the quill drive motor will continue to run until one of the dogs moving with the quill contacts its associated limit switch. This will deenergize the motor and clamp the quill. If further quill movement is programmed in the next event in the cycle, the quill again will be unclamped and the motor will run until the next dog operates its limit switch. Accurate positioning of the quill is obviously dependent upon accurate setting of the dogs and the present invention is concerned with a means for enabling the dogs to be quickly and accurately adjusted either individually or as a group.

Accordingly, it is an object of the present invention to provide an improved means for adjusting the dogs carried by a machine tool slide.

Another object of the invention is to provide an adjusting device for repositioning the dogs either individually or as a group.

Another object of the invention is to provide an adjusting device which is selectively engageable with each of the dogs so as to enable them to be individually adjusted to their desired positions.

With these and other objects in view, which will become apparent from the following description, the invention includes certain novel features of construction and combinations of parts, the essential elements of which are set forth in the appended claims, and a preferred form or embodiment of which will hereinafter be described with reference to the drawings which accompany and form a part of this specification.

Figure 3:
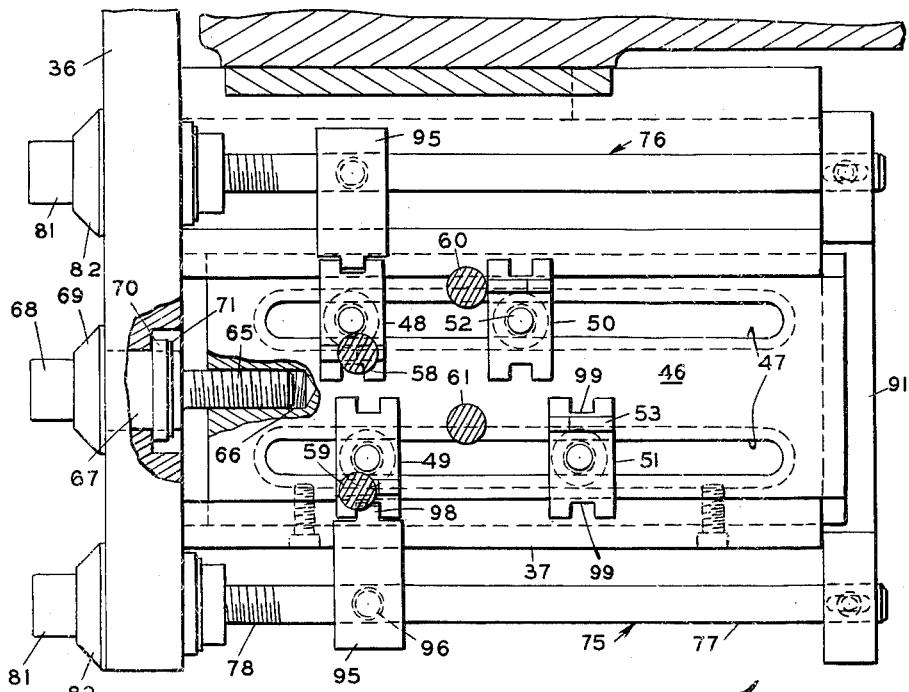
Figure 2:
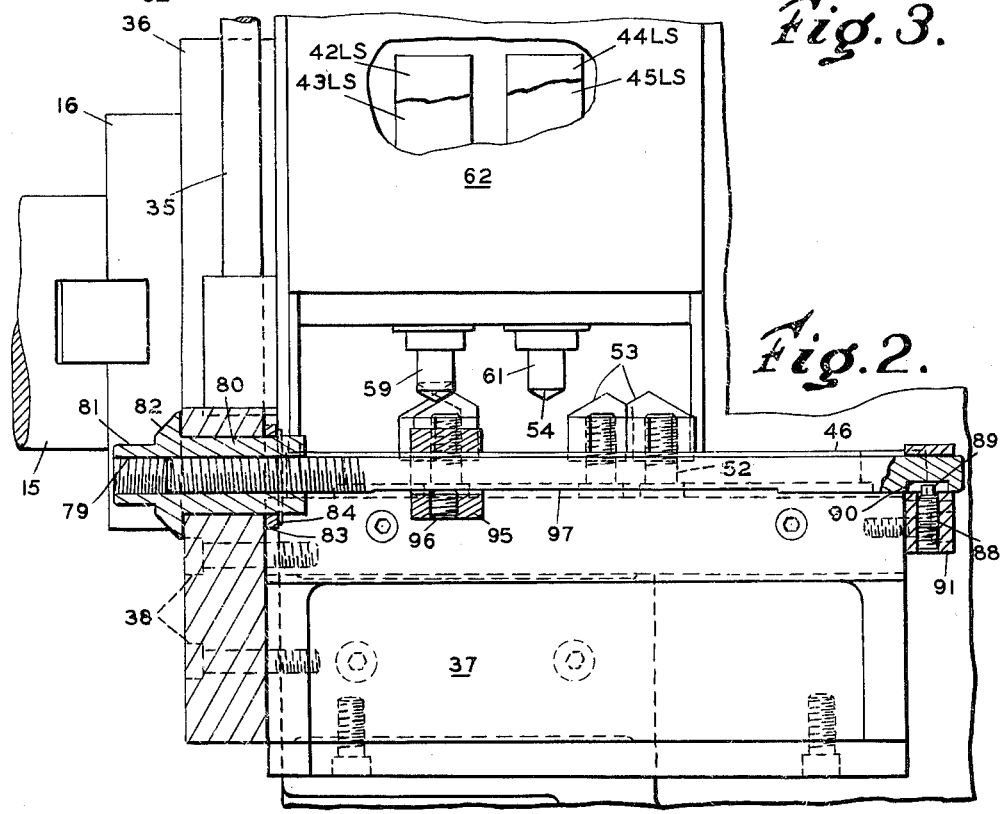
Figure 4:
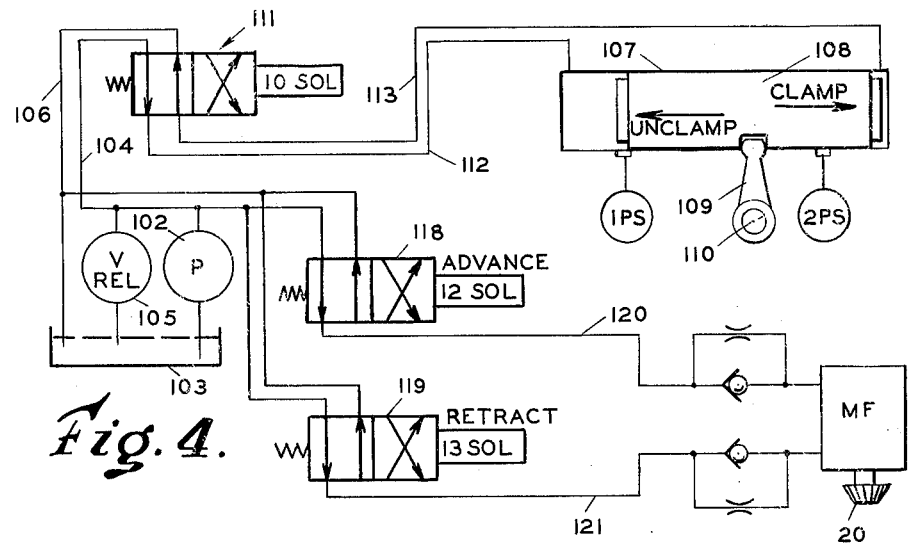
Figure 5A:
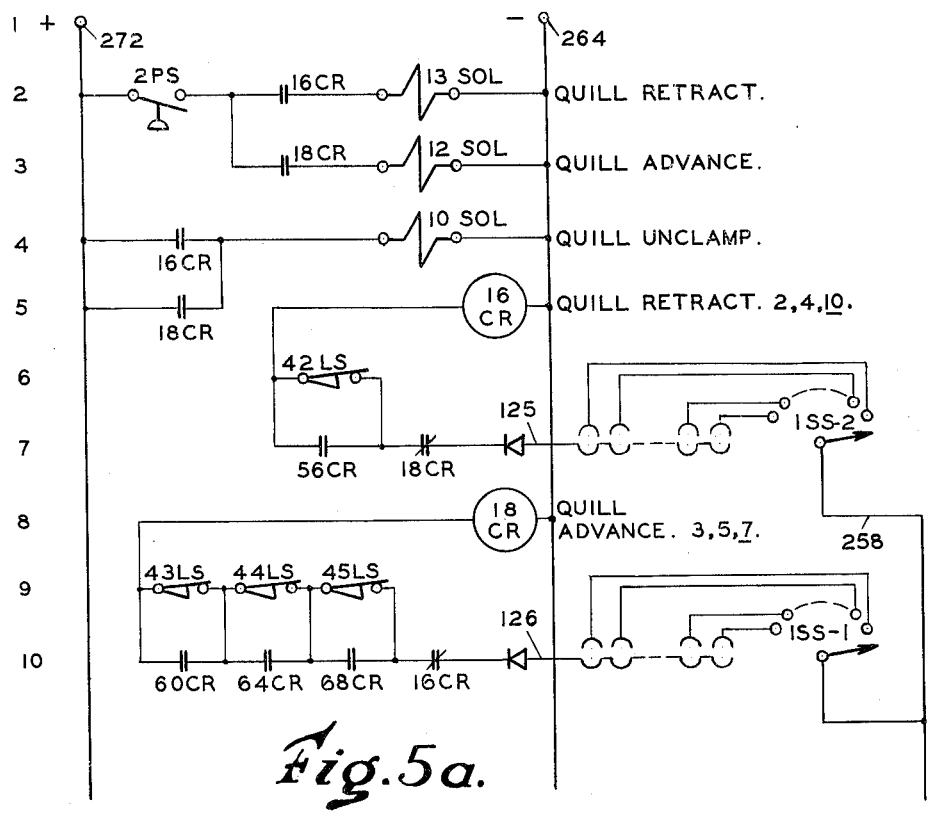
Figure 5B:
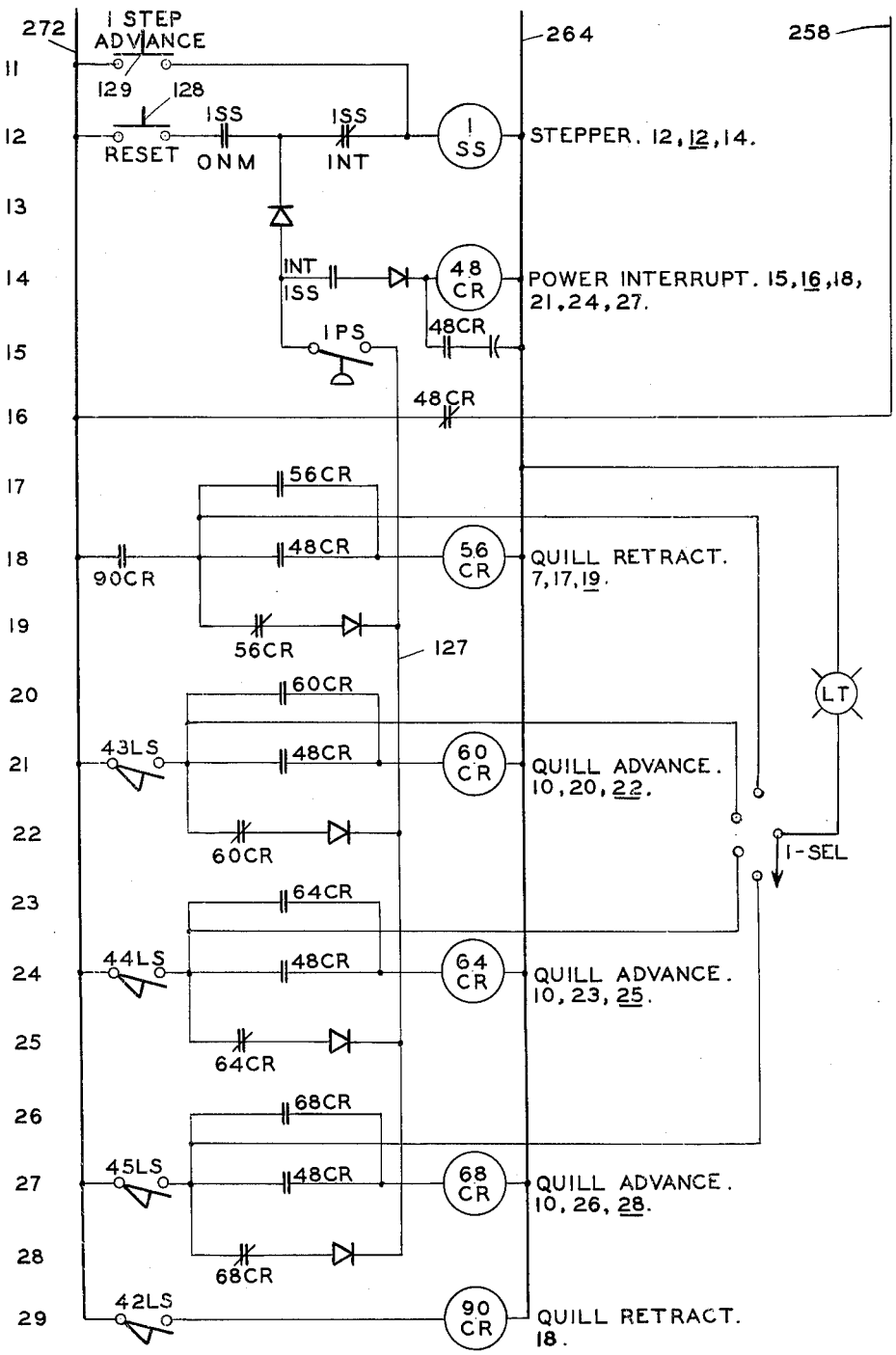

In the drawings:
FIG. 1 is a front view of a milling machine spindle carrier with parts broken away to show the quill adjusting mechanism.
FIG. 2 is a cross sectional view taken along the line 2—2 in FIG. 1.
FIG. 3 is a plan view of the dog rail and of the dog adjusting mechanism.
FIG. 4 is a hydraulic diagram for the quill operating mechanism.
FIGS. 5a and 5b together comprise a wiring diagram of the control circuits for the quill operating mechanism.

The invention is herein shown applied to the quill positioning mechanism of a horizontal milling machine of the type shown in U.S. Patent No. 3,009,399 issued November 21, 1961 on an application filed by Milton V. Waters et al. In this machine, the sequencing and extent of movement of the various slides is controlled by an automatic type of control mechanism which may be programmed as desired by plugs inserted in a program board. The mechanism and circuitry for effecting this type of sequencing control is disclosed in the Waters et al. patent and only so much of this equipment will be shown herein as is necessary to provide a complete understanding of the present invention.

Referring to FIG. 1 of the drawings, the milling machine includes a fixed bed 10 provided with a pair of horizontally extending ways on which a work table 11 is mounted for sliding movement. The bed 10 is provided with an upstanding column 12 provided with vertically extending ways on which a spindle carrier 13 is supported for vertical sliding movement. The spindle carrier is provided with suitable ways for receiving and guiding a spindle quill 14 for axial sliding movement so as to permit the spindle 16 (FIG. 2) journaled therein to be adjusted in and out of the spindle carrier. In FIG. 1 the spindle is shown with a face mill 15 mounted thereon for machining a vertical surface on a piece of work (not shown) mounted on the table 11.

Axial adjustment of the quill and of the spindle is effected by a drive mechanism shown in FIG. 1. This mechanism includes a hydraulic motor MF supported on the spindle carrier and provided with a bevel gear 20 which meshes with a bevel gear 21 secured to a drive shaft 22. This shaft is provided at its right hand end with a squared shank 23 for receiving a hand crank to effect manual rotation of the drive shaft. At its left hand end, the drive shaft is provided with an eccentric throw 24 on which is journaled a planet gear 25 adapted to mesh with the teeth of a fixed ring gear 26. As herein shown the teeth of gear 26 are cut on the inner periphery of a sleeve 27 which is secured to the frame of the spindle carrier and serves as a support for the bearings in which the drive shaft 22 is journaled.

The gear 25 also meshes with a differential ring gear 28 which is provided with teeth 29 on its inner periphery and which is coaxial with the shaft 22 and the ring gear 26. The ring gear 28 is secured to a shaft 30 to which is secured a drive pinion 31 which meshes with rack teeth 32 on the upper side of the quill 14.

A large speed reduction is effected between the hydraulic motor MF and the pinion 31 by means of the differential gearing provided by ring gears 26 and 28 and the planetary gear 25. This results from the fact that the differential gear 28 is provided with one less tooth than the gear 26 so that each revolution of the drive shaft 22 results in only a one tooth advance of the gear 28.

The quill may be clamped in any of its adjusted positions by means of a hand lever 35 or, alternatively, by a hydraulically actuated clamp mechanism (not shown) which is fully shown and described in U.S. Patent No.

2,933,986 issued April 26, 1960 on an application filed by Walter Schroeder.

In accordance with the present invention, the quill 14 has attached thereto a member on which dogs may be mounted for controlling the positioning of the quill. Thus, as shown in FIG. 1, the quill has affixed thereto a laterally extending arm 36 to which is secured a rearwardly extending bracket 37 by means of bolts 38 (FIG. 2). As shown in FIG. 1, the bracket 37 is provided at its left hand side with a rectangular groove, or way 39 which cooperates with a guide bar 40 fastened to the spindle carrier by bolts 41. This guide bar serves to support and guide the bracket 37 and the outer end of the arm 36.

The bracket 37 is provided on its upper surface with a dovetail groove 45 (FIG. 1) which extends in a direction parallel to the axis of the spindle 16. Slidably mounted in the groove 45 is a dog rail 46 provided with a pair of longitudinally extending T-slots 47 (FIG. 3) for receiving dogs 48, 49, 50 and 51 together with their clamping bolts 52 which serve to clamp the dogs in their adjusted positions along the rail. Each dog is provided with a beveled cam surface 53 (FIG. 2) for engaging with a corresponding conical surface 54 provided on the bottom of limit switch plungers 58, 59, 60 and 61 which, in turn, are associated with limit switches 42LS, 43LS, 44LS and 45LS, respectively. As shown in FIG. 1, the limit switches are mounted within a housing 62 supported on the spindle carrier over the bracket 37 and dog rail 46.

In accordance with the teachings of the present invention, means is provided for accurately adjusting the position of the dog rail 46 relative to the bracket 37 and, therefore, relative to the quill 14. For this purpose there is provided a micrometer screw 65 (FIG. 3) which is threaded into a tapped hole 66 provided in the forward end of the dog rail 46. The screw 65 is provided with a shaft 67 which is journaled in the arm 36. At its outer end, the micrometer screw is provided with a knob 68 and a dial 69 to permit accurate adjustment of the dog rail 46. Axial movement of the screw relative to the arm 36 is prevented by a washer 70 and a snap ring 71. By this means the dogs may be accurately adjusted as a group relative to the plungers of their associated limit switches.

To facilitate individual adjustment of the dogs with respect to their limit switch plungers, a pair of adjusting screws 75 and 76 is provided as shown in FIG. 3. Each screw consists of a shaft 77 provided with a micrometer screw thread 78 at its forward end. The screw thread 78 meshes with an internal thread formed within a bore 79 (FIG. 2) provided in a bushing 80. The bushing 80 is journaled in the arm 36 and is provided with a knob 81 and a dial 82. Axial movement of the bushing is prevented by a washer 83 and a snap ring 84 mounted on the bushing on the rear side of the arm. The rear end of the shaft 77 is journaled in a bar 91 bolted to the rear end of the bracket 37. Rotation of the shaft 77 is prevented by a set screw 88 in bar 91 which has a dog point 89 slidably received in an elongated groove 90 cut in the shaft 77. The shaft is thereby prevented from rotating when the micrometer dial is turned by knob 81 and longitudinal movement of the adjusting screw 75 is also limited by the ends of the groove so as to prevent the threaded portion 78 from becoming disengaged from the bushing 80.

Adjustment of the individual dogs is effected by means of a finger 95 which is bored to receive the shaft 77 and is provided on its underside with a set screw 96. This set screw cooperates with a flat 97 provided on the underside of the shaft 77 so as to prevent turning of the finger on the shaft. At its inner end, the finger 95 is provided with a square tenon 98 which is adapted to be selectively engaged with a notch 99 formed in each of the dogs. As shown in FIG. 3, a notch 99 is provided at each end of the dogs so a to permit them to be turned end for end to place the cam surfaces 53 in alignment with either of the two limit switch plungers associated with each T-slot.

To adjust an individual dog by means of the screw 75 and finger 95, the quill is first moved to position the cutter in the exact location desired after which the dog is adjusted by hand along the T-slot until its cam surface 53 is in contact with the limit switch plunger. The set screw 96 on finger 95 is then loosened to permit the finger to be turned on the shaft 77 and slid lengthwise thereof to enable the tenon 98 to be engaged with the notch 99 on the dog. After this engagement has been effected, the set screw 96 is tightened and the micrometer screw adjusted by knob 81 to move the dog into final position. This is the position in which the cam surface 53 on the dog raises the limit switch plunger to the point where the contacts of the limit switch just close. The bolt 52 is then tightened to secure the dog in its adjusted position and the finger may then be removed by loosening set screw 96 and used to adjust the position of another dog mounted in the T-slot.

After all of the dogs have been thus adjusted for a particular job or set-up, this adjustment may be permanently retained if desired, the dog rail merely being removed from the dovetail groove without disturbing the setting of the dogs and another rail inserted in the groove. Any changes in the cutter which are effected by sharpening the teeth thereof or by replacing a broken cutter with a new one may be compensated for by adjusting the dog rail as a unit through manipulation of the micrometer screw 65. Likewise, when a dog rail which has been preset for a particular job is reinserted in the bracket 37, the micrometer screw 65 provides a means for quickly and accurately adjusting the dog rail to the correct position.

The hydraulic circuit which has been provided for controlling the operation of the hydraulic motor MF and the operation of the clamp for the quill 14 is shown in FIG. 4 of the drawings. A source of hydraulic fluid under pressure is provided by a pump 102 which withdraws hydraulic fluid from a reservoir 103 and delivers it under pressure to a line 104. The pressure in line 104 may be held at a constant value by means of a relief valve 105 connected between this line and reservoir 103. A return line 106 is provided for returning the hydraulic fluid to the reservoir after it has been utilized by the fluid pressure operated units.

Clamping and unclamping of the quill is effected by a clamp cylinder 107 containing a piston 108 which is operatively connected to a crank arm 109 secured to a shaft 110. Oscillation of the shaft 110 effects clamping and unclamping of the quill 14 and the mechanism utilized for this purpose may be the same as that shown in FIGS. 7, 8, and 9 of Patent No. 2,933,986 referred to above.

Operation of the cylinder 107 is controlled by a solenoid valve 111 which is arranged to be operated by a solenoid 10SOL. When the solenoid is deenergized, as indicated in FIG. 4, fluid under pressure will be supplied to a cylinder line 112 while a line 113 connected to the other end of the cylinder will be connected to return line 106. This will cause the piston 108 to be moved to the right-hand end of the cylinder as shown in FIG. 4 to effect clamping of the quill. In order to unclamp the quill, the solenoid 10SOL is energized thereby reversing the connections to the cylinder lines 112 and 113 and causing the piston 108 to be moved to the left-hand end of the cylinder thereby locking the shaft 110 and releasing the clamp on the quill.

Movement of the piston 108 also controls the operation of pressure switches 1PS and 2PS connected to ports on the cylinder 107 as shown. Thus, when the quill is clamped, the pressure switch 1PS will be operated while switch 2PS will be released. Conversely, when the quill is unclamped, pressure switch 2PS will be operated while switch 1PS will be released.

Operation of the fluid motor MF which drives the quill in and out of the spindle carrier is controlled by a pair of solenoid valves 118 and 119 which control the flow of hydraulic fluid to the motor through the motor lines 120 and 121. Thus, when both solenoid valves are deenergized as shown, pressure fluid from line 104 will be supplied to both of the motor lines 120 and 121 thereby locking the motor against rotation. On the other hand, if solenoid 12SOL is energized while solenoid 13SOL is deenergized, line 120 will be connected to the return line 106 and the motor MF will run in a direction to advance the quill out of the spindle carrier. However, if solenoid 13SOL is energized while solenoid 12SOL remains deenergized, the motor MF will run in the opposite direction and retract the quill into the spindle carrier. If both solenoids are simultaneously energized, both of the motor lines will be connected to reservoir and the quill can then be adjusted by hand using a crank on the shaft 22 as earlier mentioned.

The electrical circuit for effecting actuation of the solenoid valves under the control of the limit switches 42LS-45LS includes a pair of electrical conductors 264 and 272 connected to a source of direct current (not shown). The energizing circuits for the various valve solenoids and control relays are connected across the conductors in series with the relay contacts which control their operation. The horizontal lines of the diagram are numbered in the left-hand margin and the lines in which the contacts of the control relays appear are provided in the right-hand margin beneath the legends denoting the functions of the relays.

The electrical circuit shown in FIGS. 5a and 5b is, in all essential respects, like the control circuit shown in Patent No. 3,009,399 to which reference may be had for a more detailed understanding of the circuit. The circuit shown herein includes the three valve solenoids 13SOL, 12SOL and 10SOL, shown in lines 2, 3 and 4 of the diagram, and the two control relays 16CR (line 5) and 18CR (line 8) which control the energization of the solenoids. Energization of the relays is controlled by a stepping switch 1SS (line 12) which has two banks of contacts, 1SS-1 and 1SS-2, shown in lines 10 and 7. As explained in Patent No. 3,009,399, the studs of the stepping switch banks are each connected to a jack in a plug board and, when the wiper of the stepping switch bank moves onto a stud which is connected to a jack containing a shorting plug, a circuit is completed from conductor 272 through an energizing line 258 (16) and wires 125 or 126 to relay 16CR or 18CR. When the relay is energized, its associated solenoid 13SOL or 12SOL is energized and causes movement of the quill in either a retract or an advance direction. At the same time, solenoid 10SOL will be energized and cause the quill to be unclamped. The quill will continue to move in the direction determined by the solenoid 12SOL or 13SOL until a limit switch is operated by the dogs moving with the quill which will cause the limit switch contacts in line 6 or 9 to open and drop out the relay. This will cause the solenoid to be deenergized and stop further movement of the quill unless the next event in the cycle calls for continued movement of the quill. Deenergization of the relay will cause its contacts in line 4 or 5 to open thereby deenergizing solenoid 10SOL and causing the quill to be clamped.

When the limit switch is operated by the dog, it also closes its contacts in lines 21, 24, 27 or 29 and connects a pulse line 127 to the conductor 272. The pulse line is connected to the stepping switch 1SS through the normally open contacts of the pressure switch 1PS (15). Since the pressure switch is now operated due to clamping of the quill, the stepping switch coil will thereby be energized and cause the interrupter contacts in line 14 to close and pick up relay 48CR. Thereby, the line 258 will be disconnected from the conductor 272 and power removed from the stepping switch banks 1SS-1 and 1SS-2. The relay 48CR also has normally open contacts in lines 18, 21, 24 and 27 which, when closed, cause relay 56CR, 60CR, 64CR or 68CR to be energized and open its contacts in line 19, 22, 25 or 28. Thus, the pulse line 127 will be disconnected from the conductor 272 and the stepping switch coil will be deenergized to thereby advance the wipers to the next stud.

The relays 56CR, 60CR, 64CR and 68CR also have normally open contacts in lines 7 and 10 which will be closed when the relay is energized upon operation of the stepper 1SS. Thereby, if further movement of the quill is programmed in the next event, a circuit will be closed around the open limit switch contacts in line 6 or 9 so that the relay 16CR or 18CR can be energized from wire 125 or 126 and cause the quill dog to move off the limit switch.

The stepper 1SS may be returned to its normal or home position by depression of a push button 128 (12) which connects the operating coil of the stepping switch to conductor 272 through the off normal make contacts ONM and the interrupter contacts INT. When the stepper reaches home, the off normal make contacts will open and prevent further stepping. Advance of the stepper to the first event, i.e., to the No. 1 stud of the stepping switch banks, may be effected by depressing and releasing a push button switch 129 (11) thereby momentarily connecting the operating coil of the switch to conductor 272.

To facilitate the set up of the quill positioning apparatus, the electrical circuit also includes a lamp LT (20) which may be connected by a selector switch 1SEL to any of the four limit switches. In this manner there is provided a means for indicating the point at which the limit switches are operated by the dogs 48-51. In practice, the quill is first adjusted until the cutter is located in the desired position after which the dog that is to control stopping of the quill in this position is adjusted by micrometer screw 75 or 76. Before adjusting the dog however, the selector switch 1SEL is turned to select the limit switch associated with the dog being adjusted. Then, when the dog is moved by the micrometer screw to a point where the contacts of the limit switch just close, the lamp will light and the dog may then be clamped in the adjusted position by means of its T-bolt. The other dogs are similarly adjusted for each of the different positions of the quill, the selector switch 1SEL being set in each case to select the limit switch being acted upon by the dog undergoing adjustment.

When a change in the cutter is effected either due to cutter breakage or on account of resharpening of the cutter teeth, the quill may be adjusted to any one of its predetermined positions. The selector switch 1SEL is then turned to select the limit switch associated with the dog for that position after which the adjusting knob 68 (FIG. 3) for the micrometer screw 65 is turned to adjust the dog rail 46 until the lamp LT lights. All the dogs will then be in their properly adjusted positions and operation of the machine may be resumed.

While in the foregoing specification a specific structure has been set forth in considerable detail for the purpose of illustrating a particular embodiment of the invention, it will be understood that such details of structure may be varied by those skilled in the art without departing from the scope of the invention as defined by the claims which follow:

What is claimed is:
1. A device for controlling the position of a machine tool slide relative to its support comprising ways on said support for guiding said element for movement thereon, means for moving said slide back and forth along said ways, means for controlling said moving means so as to effect movement of said slide from one position to another relative to said support including one or more selectively operable trip elements on said support, a member movable with said slide as it is translated along said ways, and one or more dogs on said member for operating one of said trip elements in each of said positions of the slide, and means including a micrometer screw and dial for adjusting the position of said member relative to said slide along the direction of movement thereof to thereby advance or retract all of the dogs in unison relative to said trip elements.

2. A device for controlling the position of a machine tool slide relative to its support comprising ways on said support for guiding said element for movement thereon, means for moving said slide back and forth along said ways, means for controlling said moving means so as to effect movement of said slide from one position to another relative to said support including one or more selectively operable trip elements on said support, a member movable with said slide as it is translated along said ways, and one or more dogs individually supported on said member for movement relative thereto in a direction parallel to the movement of said slide and adapted to operate one of said trip elements in each of said positions of the slide, and means for individually adjusting the position of each of said dogs along said member comprising a finger supported for sliding movement relative to said member in a direction corresponding to the direction of movement of said slide, a micrometer screw for adjusting said finger relative to said member, and a separable connection between said finger and said dogs whereby said dogs may each be precisely adjusted on said member by manipulation of said screw.

3. A device for controlling the position of the quill of a machine tool relative to its support comprising ways on said support for guiding said quill for longitudinal movement relative thereto, power means for moving said quill back and forth along said ways, means for controlling the operation of said power means so as to effect movement of said quill from one position to another relative to said support including one or more selectively operable trip elements on said support, a member movable with said quill as it is translated back and forth along said ways, a dog rail supported on said member for translatory movement in the direction of movement of said quill, and one or more dogs on said rail for operating one of said trip elements in each of said positions of the quill, and means including a micrometer screw and dial for adjusting the position of said rail relative to said member to thereby advance or retract all of the dogs simultaneously relative to said trip elements.

4. A device for controlling the position of the quill of a machine tool relative to its support comprising ways on said support for guiding said quill for longitudinal movement relative thereto, power means for moving said quill back and forth along said ways, means for controlling the operation of said power means so as to effect movement of said quill from one position to another relative to said support including one or more selectively operable trip elements on said support, a member movable with said quill as it is translated back and forth along said ways, a dog rail supported on said member for translatory movement in the direction of movement of said quill, and one or more dogs individually supported on said rail for movement relative thereto in a direction parallel to the movement of said quill and adapted to operate one of said trip elements in each of said positions of the quill, and means for individually adjusting the position of each of said dogs along said rail comprising a finger supported on said member for sliding movement relative to said rail in a direction corresponding to the direction of movement of said slide, a micrometer screw for adjusting said finger relative to said rail, and a separable connection between said finger and said dogs whereby said dogs may each be precisely adjusted on said rail by manipulation of said screw.

5. The device of claim 1 wherein said dogs are individually supported on said member for movement relative thereto in a direction parallel to the direction of movement of said slide and including means for individually adjusting each of said dogs on said member, said means comprising a finger supported for sliding movement relative to said member in a direction parallel to the direction of movement of said slide, a micrometer screw for adjusting said finger relative to said member, and a separable connection between said finger and said dogs whereby said dogs may each be precisely adjusted on said member by manipulation of said screw.

6. The device of claim 3 wherein said dogs are individually supported on said rail for movement relative thereto in a direction corresponding to the direction of movement of said quill and including means for individually adjusting each of said dogs on said rail, said means comprising a finger supported on said member for sliding movement relative to said rail in a direction parallel to the direction of movement of said quill, a micrometer screw for adjusting said finger relative to said rail, and a separable connection between said finger and said dogs whereby said dogs may each be precisely adjusted on said rail by manipulation of said screw.

References Cited by the Examiner
UNITED STATES PATENTS

| 2,122,221 | 6/38 | Valiquette | 33—181 |
| 2,539,373 | 1/51 | North | 33—181 |
| 2,557,860 | 6/51 | Bickel et al. | |
| 2,906,141 | 9/59 | Kocsi | 74—526 |

WILLIAM W. DYER, Jr., *Primary Examiner.*

LEON PEAR, *Examiner.*